United States Patent
Ringuette et al.

(10) Patent No.: US 11,169,749 B2
(45) Date of Patent: Nov. 9, 2021

(54) DYNAMIC PRINTER SETTING BASED ON DOCUMENT ANALYSIS

(71) Applicant: Lenovo (Singapore) Pte. Ltd., Singapore (SG)

(72) Inventors: Justin Michael Ringuette, Morrisville, NC (US); Sandy Scott Collins, Durham, NC (US); Richard Todd Wall, Clayton, NC (US); Jimmie Dale Treat, Raleigh, NC (US); Wiechun Zhou, Shanghai (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/544,392

(22) Filed: Aug. 19, 2019

(65) Prior Publication Data
US 2021/0055890 A1    Feb. 25, 2021

(51) Int. Cl.
*G06F 3/12* (2006.01)
*G06T 7/00* (2017.01)
*H04N 1/23* (2006.01)

(52) U.S. Cl.
CPC ......... *G06F 3/1204* (2013.01); *G06F 3/1254* (2013.01); *G06F 3/1293* (2013.01); *G06T 7/0002* (2013.01); *H04N 1/2323* (2013.01); *H04N 1/2369* (2013.01); *G06T 2207/30176* (2013.01)

(58) Field of Classification Search
CPC .......... H04N 1/00087; H04N 1/00779; H04N 1/00822; H04N 1/00962; H04N 1/2369; H04N 2201/33335; H04N 1/2323; G06F 3/1253–1258; G06K 15/1803–1809; G06K 15/1822; G06K 15/1825; G06K 15/1848; G06K 15/1868
See application file for complete search history.

(56) References Cited

U.S. PATENT DOCUMENTS

| | | | | |
|---|---|---|---|---|
| 4,420,819 A * | 12/1983 | Price | ...................... | G06Q 99/00 705/405 |
| 7,812,996 B2 * | 10/2010 | Sakamoto | ............... | G06F 3/125 358/1.18 |
| 2003/0038988 A1 * | 2/2003 | Anderson | .............. | H04N 1/233 358/474 |
| 2008/0088865 A1 * | 4/2008 | Nagai | ................... | G06F 3/1285 358/1.13 |
| 2009/0190143 A1 * | 7/2009 | Matsumoto | .......... | H04N 1/2307 358/1.1 |
| 2010/0165405 A1 * | 7/2010 | Okumura | ........... | H04N 1/00602 358/1.16 |

(Continued)

*Primary Examiner* — Scott A Rogers
(74) *Attorney, Agent, or Firm* — Ference & Associates LLC

(57) ABSTRACT

One embodiment provides a method, including: receiving, at an information handling device, a request to print a document; analyzing, using a processor, content of the document; determining, based on the analyzing, a printing characteristic of the content, wherein the printing characteristic comprises at least one of: a simplex printing characteristic and a duplex printing characteristic; establishing, based on the printing characteristic, a printer setting for printing the document. Other aspects are described and claimed.

18 Claims, 3 Drawing Sheets

(56) References Cited

U.S. PATENT DOCUMENTS

| | | | |
|---|---|---|---|
| 2010/0309499 A1* | 12/2010 | Ebi | G06F 3/1285 |
| | | | 358/1.13 |
| 2011/0243637 A1* | 10/2011 | Nakamura | G06K 15/022 |
| | | | 400/583 |
| 2012/0206764 A1* | 8/2012 | Fujii | G03G 15/234 |
| | | | 358/1.15 |
| 2014/0108136 A1* | 4/2014 | Zhao | G06Q 10/0833 |
| | | | 705/14.49 |
| 2018/0095398 A1* | 4/2018 | Yoshida | B41J 2/17509 |
| 2019/0094777 A1* | 3/2019 | Hren | B41J 3/60 |

* cited by examiner

DYNAMIC PRINTER SETTING BASED ON DOCUMENT ANALYSIS

BACKGROUND

A print job may include information, for example, a document, file, picture, or the like, that a user may wish to print in a specific format, for example, as a two-sided document, a single-sided document, and the like. For example, a user's print job may include thirty pages of monochromatic text that a user wishes to print by utilizing both sides of the print paper to minimize the amount of paper necessary for printing the print job. On the other hand, the user may want pictures to be printed utilizing single-sided printing. Additionally, some documents may include elements that a user wishes to be printed utilizing single-sided printing and some elements that a user wishes to be printed utilizing double-sided printing. For example, a user may wish a legal document to be printed utilizing double-sided printing except for any signature pages which the user wishes to be printed utilizing single-sided printing.

BRIEF SUMMARY

In summary, one aspect provides a method, comprising: receiving, at an information handling device, a request to print a document; analyzing, using a processor, content of the document; determining, based on the analyzing, a printing characteristic of the content, wherein the printing characteristic comprises at least one of: a simplex printing characteristic and a duplex printing characteristic; establishing, based on the printing characteristic, a printer setting for printing the document.

Another aspect provides an information handling device, comprising: a processor; a memory device the stores instructions executable by the processor to: receive, at an information handling device, a request to print a document; analyze, using a processor, content of the document; determine, based on the analyzing, a printing characteristic of the content, wherein the printing characteristic comprises at least one of: a simplex printing characteristic and a duplex printing characteristic; establish, based on the printing characteristic, a printer setting for printing the document.

A further aspect provides a product, comprising: a storage device that stores code the code being executable by a processor and comprising: code that receives, at an information handling device, a request to print a document; code that analyzes, using a processor, content of the document; code that determines, based on the analyzing, a printing characteristic of the content, wherein the printing characteristic comprises at least one of a: simplex printing characteristic and a duplex printing characteristic; code that establishes, based on the printing characteristic, a printer setting for the document.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
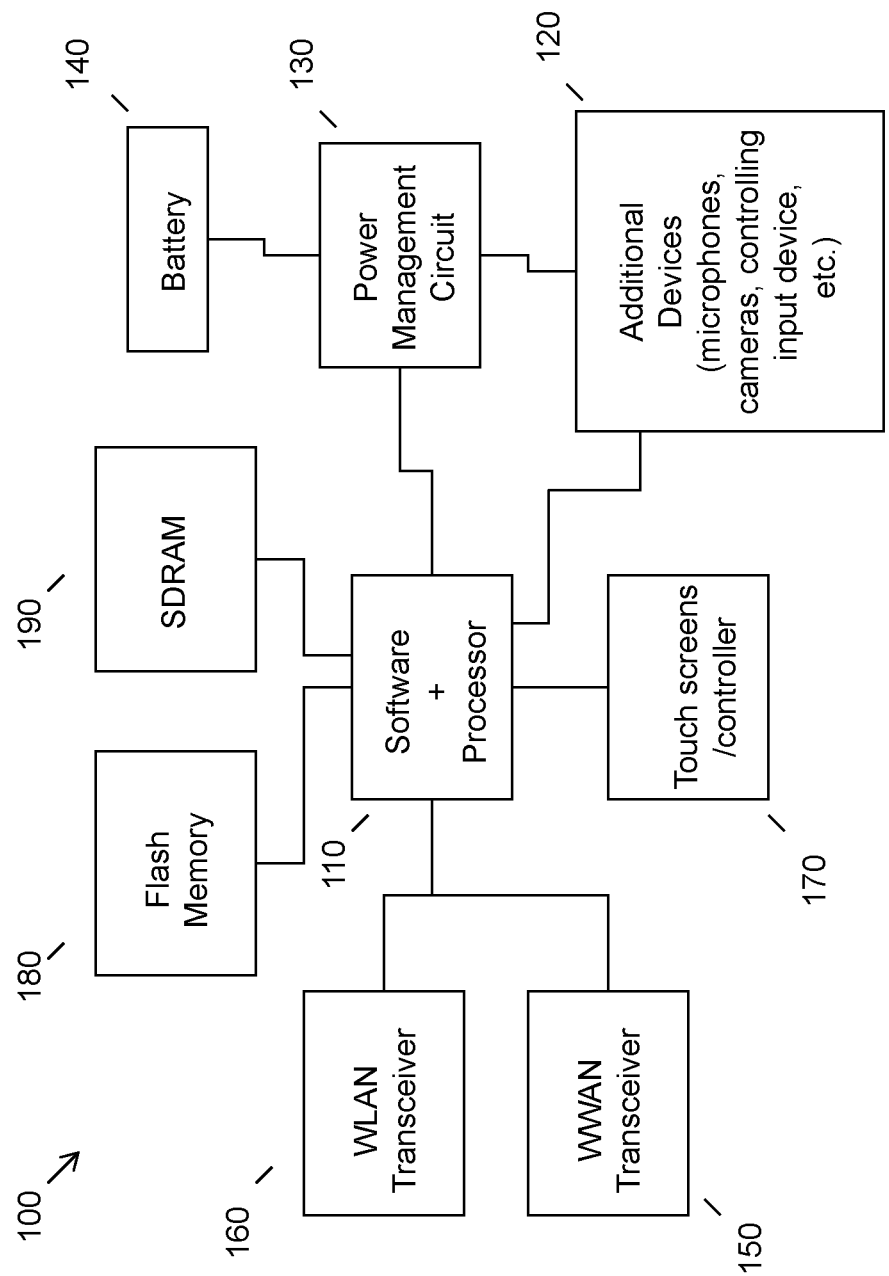
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

To utilize different printer settings, specifically, simplex (i.e., single-sided printing) and duplex (i.e., double-sided printing) settings, a user will have to manually adjust printer settings either on the printer itself or within an application associated with the printer. Sometimes these settings can be adjusted within the application of the document. In other words, when requesting a document (e.g., file, document, image, etc.) be printed, the user may utilize the print settings within the application associated with the document to set the printer settings. Remembering to set the correct print settings for a print job can be difficult and result in wasted time and paper when documents are printed with undesired print settings. Additionally, some print jobs can become complex by containing multiple different types of documents or content that would have different printer settings within a single print job. Since a printer can only perform under a single printer setting for a print job having to set up different print jobs for each portion of the document that would be printed under different print settings may lead to inconveniences, the use of an excessive amount of paper, and/or increased time when printing.

As stated above, conventionally, a user must manually input printer settings when seeking a desired orientation for a print job. Throughout this application, the term orientation will be used to describe the print style used for a print job. The orientation of a print job selected by a user includes single-sided printing or simplex printing, or doubled-sided printing or duplex printing. Since, a printer may print a print job with respect to only one orientation, meaning that a print job can only be printed out in a simplex or a duplex orientation, a user that wishes to utilize both orientations for a document must manually input two print jobs, and also must be accurate when selecting the printing style for the specific pages within a document. For example, if a document contains 26 pages, and on page 13 there is a form that needs signed, a user may wish to perform duplex printing for all pages except page 13. In doing this, three separate print jobs must be performed and manually input into a system by the user. The first print job will cover the duplex printing of pages 1-12 of the document, the second print job will cover the simplex printing of page 13 containing the form that needs signed, and the third print job will cover the duplex printing of pages 14-26. Manually inputting printer settings is a tedious action for performance by a user, and can be especially time consuming when a single document is manually broken up into multiple print jobs. Additionally, it introduces an opportunity for user error resulting in pages being printed in an undesired orientation. Conventional techniques for recognizing document characteristics include word filtering, picture recognition, optical character recognition (OCR), and the like. Using these techniques individually can provide document information back to a system or user. However, the information relayed back does not describe a printing characteristic regarding the orientation of the pages. In this context, orientation does not refer to a portrait and/or landscape orientation, and rather refers to the simplex/duplex printing orientation.

Accordingly, an embodiment provides a method for analyzing the content of document for printing characteristics, and based on the printing characteristics of a document, automatically adjusting the printer settings to account for the recognized printer characteristic. A system may recognize printing characteristics from analyzed content of a document. These recognized printing characteristics may then be associated with a specific printing orientation, i.e. simplex orientation or duplex orientation. In an embodiment, a system may recognize that a document includes printing characteristics for both orientations. In an embodiment, the recognition of printing characteristics identifying separate orientations may automatically identify which pages of a document contain printing characteristics for each of the orientation, and the system may then group the pages identified as having simplex printing characteristics into one print job and the pages identified as having duplex printing characteristics into another print job. The ability of a system to automatically adjust printer settings based on the recognition of printing characteristics may provide a user with a system that performs more efficiently with respect to time and resources in comparison to conventional methods.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, controlling input device such as a mouse and keyboard, dedicated gaming controller or joystick, etc. System 100 often includes one or more touch screens 170 for data input and display/rendering. System 100 also typically includes various memory devices, for example flash memory 180 and SDRAM 190.

Figure 2:
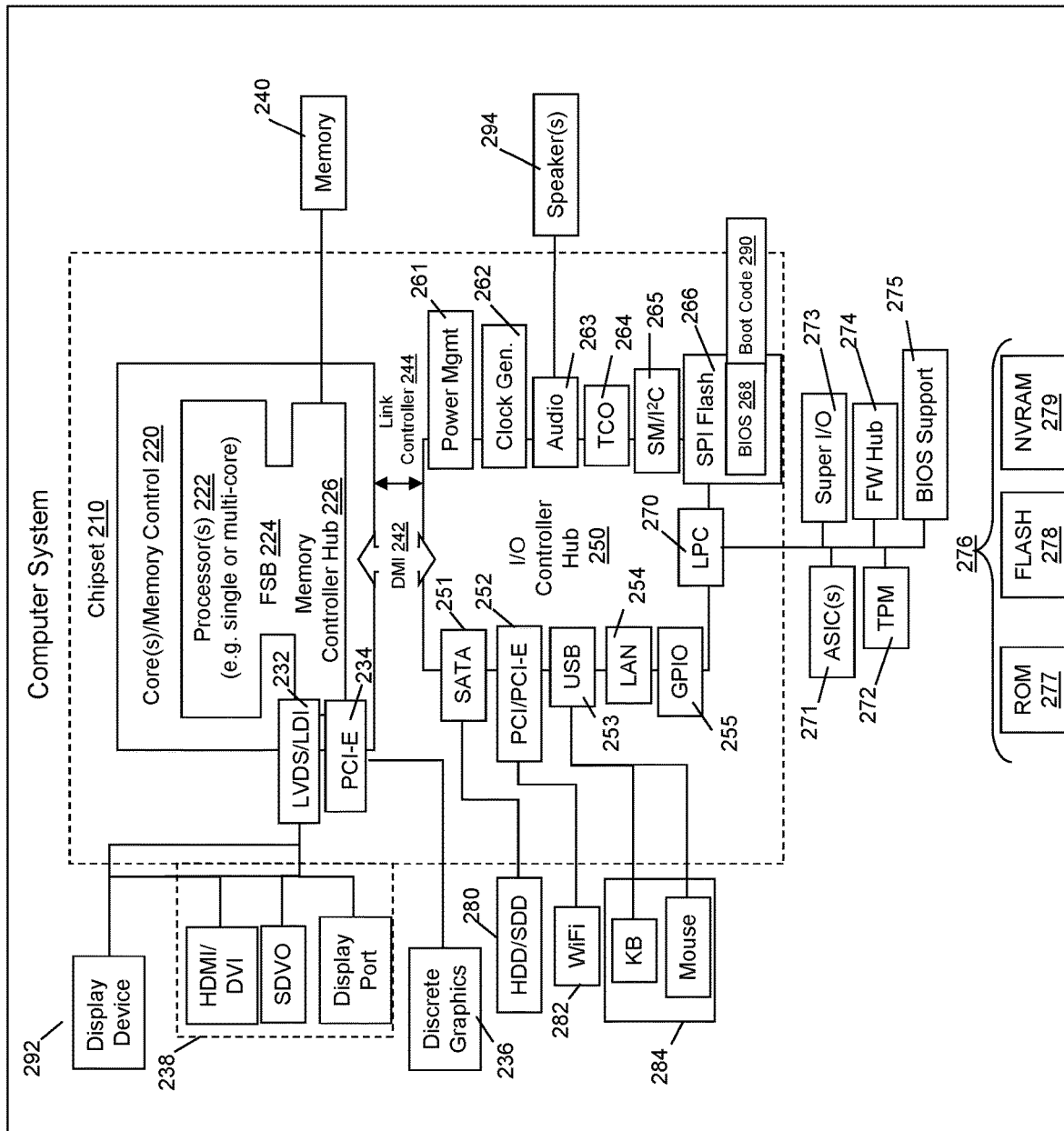
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, micro-phones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices utilized by users to access secure service. Additionally or alternatively, the circuitry may be used in devices supporting secure services. For example, the circuitry outlined in FIG. 1 may be implemented in a smart phone or tablet embodiment, whereas the circuitry outlined in FIG. 2 may be implemented in a laptop.

Figure 3:
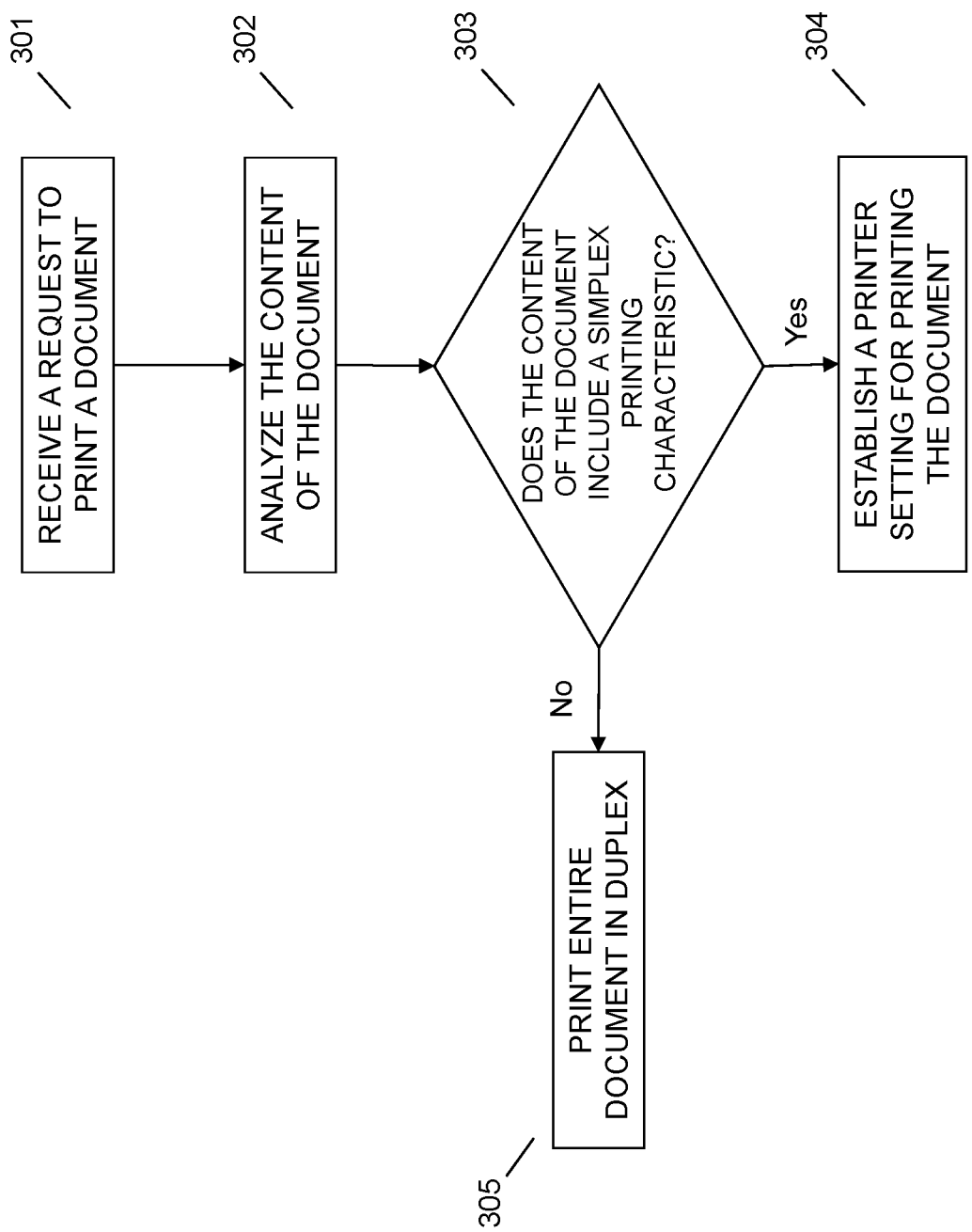
FIG. 3 illustrates an example method of analyzing the content of a document to be printed and determining a printer setting based on the content of the document.

FIG. 3 illustrates a system and method for recognizing printing characteristics within a document for printing and adjusting a printer setting to print the print job in a desired orientation. As a user requests to print a document a printer may receive the request to print the document at 301. In an embodiment, a printer may turn on automatically responsive to receiving a request to print a document. In an embodiment, a user may have to manually turn on a printer. At 302, a system may analyze the content within the received document. A document may be analyzed in an attempt to recognize any printing characteristics that may be associated with a printing orientation. The analysis may recognize content or characteristics included within the document that would identify a printing orientation for the content, for example, simplex printing characteristics or duplex printing characteristics. The analysis may include any type of document or image analysis, for example, optical character recognition (OCR) to recognize text, image analysis to recognize pictures, images, or tables, or the like. By recognizing different elements (e.g., text, images, tables, fields, signature fields, etc.) within the document, the system can determine if such an element would be associated with a simplex or duplex printing orientation. Determining the association may include recognizing the elements and comparing the elements to a list that identifies what printing orientation such an element corresponds with.

Content or characteristics that may indicate a simplex printing orientation, simply referred to as simplex printing characteristics, may include, for example, shipping labels and signature fields. As a non-limiting example, a shipping label may be recognized and affiliated with simplex printing characteristics because only one side of a shipping label is viewable when attached to a package. Additionally, and as a non-limiting example, a user may require that all pages containing a signature field are printed in simplex. Content or characteristics that may indicate a duplex printing orientation, simply referred to as duplex printing characteristics, may include, for example, uninterrupted monochrome text (e.g., paragraphs, pages, etc.) or simply an absence of simplex printing characteristics. In an embodiment, a document that does not include a simplex printing characteristic may be printed out with a duplex orientation. Other types of content and or characteristics may be identified as simplex/duplex printing characteristics and may include any content that a user wants to print in simplex/duplex.

Simplex/duplex characteristics or content may be identified by the user or automatically identified based upon rules, crowdsourced information, machine-learning models, or the like, which may identify the characteristics as simplex/duplex printing characteristics. For example, a user may manually identify particular content for simplex/duplex printing and a machine-learning model may use this input to learn simplex/duplex printing characteristics over time, thereby refining the machine-learning model to more accurately identify simplex/duplex printing characteristics over time. As another example, an embodiment may receive user input from multiple users (e.g., crowdsourced input) and utilize these inputs to learn simplex/duplex printing characteristics.

In an embodiment, the analysis of a document may be performed across an entire document before the print job is sent to the print. Performing the analysis across the entire document may allow a system to locate any present printing characteristics. The system then may tag each portion of the document comprising a printing characteristic before sending the print job to the printer and adjusting a printer setting. By tagging each portion of the document prior to sending a print job to the printer, in an embodiment where simplex and duplex characteristics are both present in a document, a system may separate the pages containing simplex printing characteristics and duplex printing characteristics into separate print jobs corresponding to each printing characteristic. By separating the print jobs based on the printing characteristics present, and ultimately the printing orientation, a document may be split into a reduced number of print jobs, for example, two print jobs, thereby allowing the system to easily toggle between the two printing orientations. Alternatively, the document may be separated into print jobs as each printing characteristic is encountered in order to ensure that the pages of the document are printed in order.

In an embodiment, the analysis of a document may be performed page-by-page as a document is sent to a printer. Analysis of the printing characteristics present on a page may occur while document is being received by the printer. A system may recognize and toggle the printer orientation as a document is being printed, or in real time, which may provide a mechanism to keep pages in order as they are printed. Page-by-page analysis may allow a system to move at a quicker pace for smaller jobs, as analysis across an entire document may be more beneficial for larger document jobs. Additionally, for the documents that include single or minimal pages of a second print orientation, page-by-page analysis may provide the quickest print time. On the other hand, for documents that comprise a plurality of pages that may fall under both print orientations, analysis of the entire document prior sending print jobs to the printer may provide the most efficient print jobs.

For example, a document print job may be a short story containing 26 pages with a picture on the $13^{th}$ page, which only the page including the picture the a user elects to be printed in simplex. By using page-by-page analysis, a system may quickly start printing in a duplex orientation for the first 12 pages of the document because the document is all text up to the $13^{th}$ page. Then at the $13^{th}$ page a system may toggle the printer setting to a simplex orientation for the picture, and then toggle back to a duplex orientation when the printing of the picture is completed. Additionally, as another example, a document received with a request to be printed may include a 200 page pamphlet that contains 25 pages that require signatures and need to be turned in, as well as the final page being a shipping label to be used to mail back the signatures. Analyzing the entire document prior to sending a print job to the printer may allow a system to recognize which pages demand simplex orientation (e.g., 25 pages with signatures, and shipping label page) and which demand duplex orientation (e.g., all pages that do not contain a simplex printing characteristics), and they may be separated into different print jobs. Separating the pages by desired print orientation may allow a system to perform more efficiently, rather than constantly toggling back-and-forth between printer settings.

At 303, a system may determine, based on the analysis at 302, whether content of the received document requested to be printed includes a printing characteristic. As mentioned previously, printing characteristics may be associated with a specific orientation, and the determination of the presence of at least one characteristic may alter the print orientation. In an embodiment that does not include a simplex printing characteristic a document may be instructed to print an entire document with a duplex orientation at 305. A duplex characteristic, as mentioned previously, may be the absence of a simplex printing characteristic. By automatically performing a print job with a duplex orientation, the amount of time and the amount of paper used for an average job may be less than is used in conventional methods.

When a simplex printing characteristic is found within the content of a document, a system may establish a printer setting for the document, at 304. Since a simplex characteristic is found within a document, a system may already be aware that at least one page (the page comprising the simplex printing characteristic) will be printed with a simplex orientation. In an embodiment, establishing the printer setting may require a user to confirm that the printer setting selected by the system is accurate and that the system may move forward. Based on the amount of simplex characteristics present in a document, a system may determine a printer setting regarding print orientation for the document. Additionally, in an embodiment, based on the size of the document, a system may determine the type of analysis to be used when attempting to recognize printing characteristics, and based on the amount of simplex printing characteristics found in a document a system may determine the amount of print jobs necessary for a document.

Thus, the described system and method provide a technical improvement over current document analysis to determine a print orientation by providing system that may automatically toggle printer settings and analysis modes. The described system solves the problem of manually adjusting printer settings for documents containing specific characteristics, as well as provides a more resource and time efficient system. Thus, not only does the described system recognize printing characteristics affiliated with a print orientation and adjusts printer settings based on the characteristics present, but it may also separate documents comprising many characteristics into multiple print jobs, and provides an overall analysis for documents of all sizes.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, a request to print a document, wherein the document comprises a plurality of pages of print material;
determining an analysis type for the document based upon a size of the document identified from the plurality of pages of print material;
analyzing, using a processor and the analysis type, content of the document, wherein the analyzing comprises recognizing characteristics included within the document and for each of the plurality of pages;
determining, based on the recognized characteristics within the document recognized utilizing the analysis type, a printing characteristic of the content for each of the plurality of pages, wherein the printing characteristic comprises at least one of: a simplex printing characteristic and a duplex printing characteristic, wherein the determining comprises determining an association of a recognized characteristic with a printing characteristic for each page within the document corresponding to the recognized characteristic, wherein the determining comprises determining a number of print jobs for the document based upon the printing characteristic for each page; and
automatically establishing, based on the printing characteristic, a printer setting for printing each page of the document within each one of the number of print jobs, wherein the establishing comprises toggling the printer setting based upon the printing characteristic for each page within the document, wherein the toggling the printer setting occurs between the number of print jobs of the document.

2. The method of claim 1, wherein the content of the document comprises both a simplex printing characteristic and a duplex printing characteristic.

3. The method of claim 2, wherein the establishing a printer setting comprises setting the printer setting for simplex printing of the content corresponding to the simplex printing characteristic and setting the printer setting for duplex printing of the content corresponding to the duplex printing characteristic.

4. The method of claim 1, wherein the analyzing is performed page-by-page as the document is sent to the printer; and
wherein the establishing the printer setting comprises establishing the printer setting page-by-page during printing.

5. The method of claim 1, wherein the analyzing is performed for the entire document before being sent the printer; and
wherein the establishing a printer setting comprises tagging each portion of the document having a different printer characteristic, before being sent to the printer, with a printer setting.

6. The method of claim 1, wherein the establishing a printer setting comprises establishing a printer setting upon receiving, from a user, confirmation of a printer setting identified from the printing characteristic.

7. The method of claim 1, wherein the analyzing comprises identifying the content as at least one of: an uninterrupted monochrome text and an absence of simplex items; and
wherein the printing characteristic of the content comprises the duplex printing characteristic.

8. The method of claim 1, wherein the analyzing comprises identifying the content as at least one of: a shipping label and a signature field; and
wherein the printing characteristic of the content comprises the simplex printing characteristic.

9. The method of claim 1, wherein the analyzing comprises utilizing optical character recognition.

10. An information handling device, comprising:
a processor;
a memory device the stores instructions executable by the processor to:
receive, at an information handling device, a request to print a document, wherein the document comprises a plurality of pages of print material;
determine an analysis type for the document based upon a size of the document identified from the plurality of pages of print material;
analyze, using a processor and the analysis type, content of the document, wherein to analyze comprises to recognize characteristics included within the document and for each of the plurality of pages;
determine, based on the recognized characteristics within the document recognized utilizing the analysis type, a printing characteristic of the content for each of the plurality of pages, wherein the printing characteristic comprises at least one of: a simplex printing characteristic and a duplex printing characteristic, wherein the determining comprises determining an association of a recognized characteristic with a printing characteristic for each page within the document corresponding to the recognized characteristic, wherein the determining comprises determining a number of print jobs for the document based upon the printing characteristic for each page; and
automatically establish, based on the printing characteristic, a printer setting for printing each page of the document within each one of the number of print jobs, wherein the establishing comprises toggling the printer setting based upon the printing characteristic for each page within the document, wherein the toggling the printer setting occurs between the number of print jobs of the document.

11. The information handling device of claim 10, wherein the content of the document comprises both a simplex printing characteristic and a duplex printing characteristic.

12. The information handling device of claim 11, wherein to establish a printer setting comprises setting the printer setting for simplex printing of the content corresponding to the simplex printing characteristic and setting the printer setting for duplex printing of the content corresponding to the duplex printing characteristic.

13. The information handling device of claim 10, wherein to analyze is performed page-by-page as the document is sent to the printer; and
wherein the establishing the printer setting comprises establishing the printer setting page-by-page during printing.

14. The information handling device of claim 10, wherein to analyze is performed for the entire document before being sent the printer; and wherein the establishing a printer setting comprises tagging each portion of the document having a different printer characteristic, before being sent to the printer, with a printer setting.

15. The information handling device of claim 10, wherein to establish a printer setting comprises establishing a printer setting upon receiving, from a user, confirmation of a printer setting identified from the printing characteristic.

16. The information handling device of claim 10, wherein to analyze comprises identifying the content as at least one of: an uninterrupted monochrome text and an absence of simplex items; and
   wherein the printing characteristic of the content comprises the duplex printing characteristic.

17. The information handling device of claim 10, wherein to analyze comprises identifying the content as at least one of: a shipping label and a signature field; and
   wherein the printing characteristic of the content comprises the simplex printing characteristic.

18. A product, comprising:
   a non-transitory storage device that stores code the code being executable by a processor and comprising code that causes the processor to:
   receive, at an information handling device, a request to print a document, wherein the document comprises a plurality of pages of print material;
   determine an analysis type for the document based upon a size of the document identified from the plurality of pages of print material;
   analyze content of the document and the analysis type, wherein to analyze comprises to recognize characteristics included within the document and for each of the plurality of pages;
   determine, based on the recognized characteristics within the document recognized utilizing the analysis type, a printing characteristic of the content for each of the plurality of pages, wherein the printing characteristic comprises at least one of: a simplex printing characteristic and a duplex printing characteristic, wherein the determining comprises determining an association of a recognized characteristic with a printing characteristic for each page within the document corresponding to the recognized characteristic, wherein the determining comprises determining a number of print jobs for the document based upon the printing characteristic for each page; and
   automatically establish, based on the printing characteristic, a printer setting for printing each page of the document within each one of the number of print jobs, wherein the establishing comprises toggling the printer setting based upon the printing characteristic for each page within the document, wherein the toggling the printer setting occurs between the number of print jobs of the document.

* * * * *